UNITED STATES PATENT OFFICE.

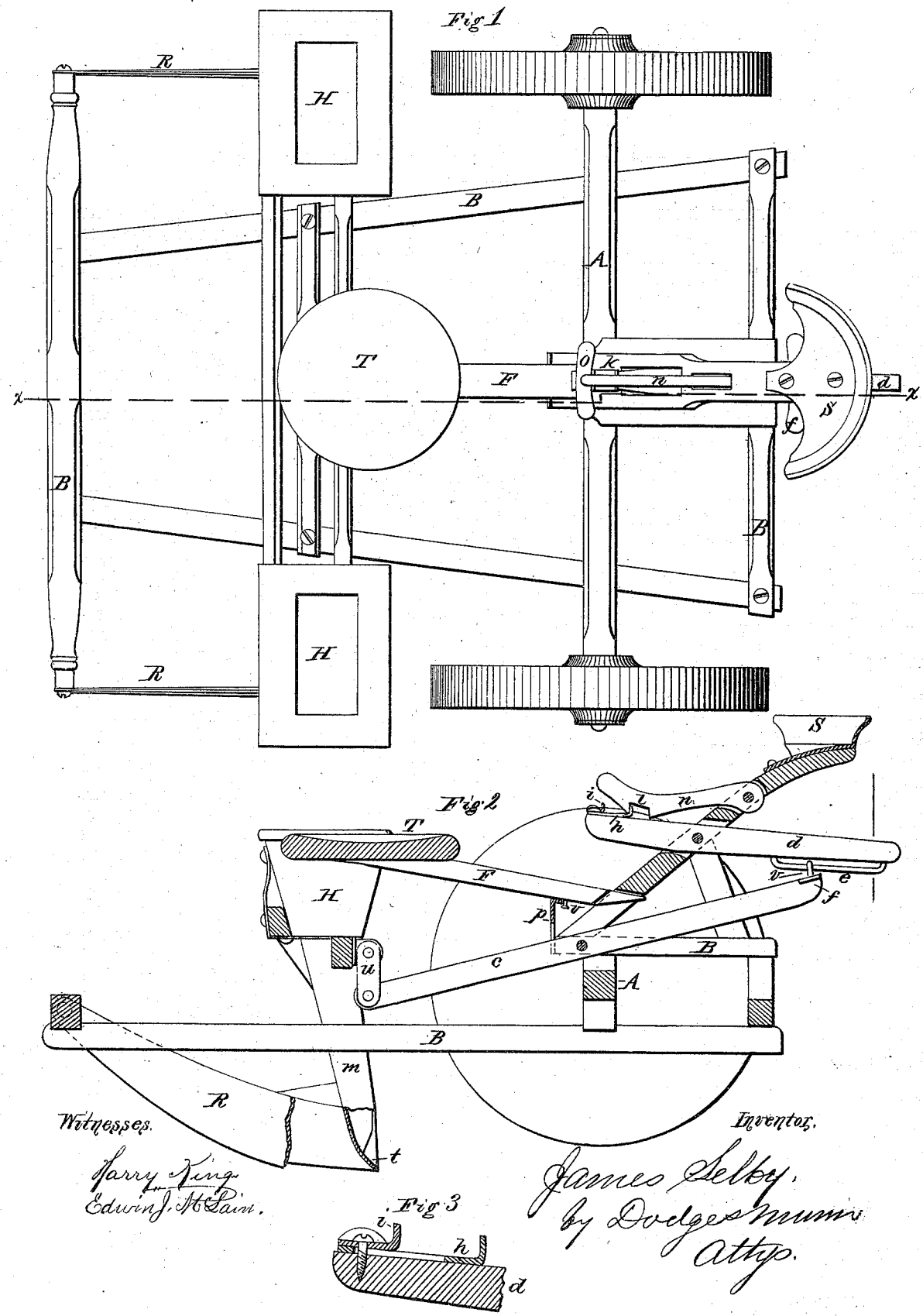

JAMES SELBY, OF PEORIA, ILLINOIS.

IMPROVEMENT IN CORN-PLANTERS.

Specification forming part of Letters Patent No. 126,751, dated May 14, 1872.

SPECIFICATION.

*To all whom it may concern:*

Be it known that I, JAMES SELBY, of Peoria, in the county of Peoria and State of Illinois, have invented certain Improvements in Corn-Planters, of which the following is a specification, reference being had to the accompanying drawing.

My invention relates to corn-planters; and the invention consists in an arrangement of levers and stop for regulating and adjusting the depth at which the runners shall operate; also, in a novel arrangement of the seats, and in a device applied to the seed-tube, for throwing the seed backward in the furrow, to counteract or compensate for the forward motion of the machine, as hereinafter more fully explained.

Figure 1 is a top-plan view of the machine. Fig. 2 is a longitudinal vertical section of the same on the line $x\ x$ of Fig. 1; and Fig. 3 is a section of a portion, shown detached and enlarged.

The general plan of my improved planter is the same as that heretofore patented to me; and it consists of an axle, A, mounted on wheels, with a rigid frame, B, attached, to the front end of which are pivoted the runners R, the seed-hoppers being mounted upon the rear end of the runners, as represented in the drawing. Over the axle A, centrally, I pivot a lever, $c$, the front end of which is connected, by links $u$, to the hopper-frame, this lever extending back to the rear end of the main frame B under the driver's seat S, where it is provided with a foot-piece, $f$, as shown in Fig. 2. In the standard that supports the seat S I pivot another lever, $d$, the front end of which is also provided with a foot-piece, $o$. At their rear ends these two levers $c$ and $d$ are connected by a sliding joint, by which they are permitted to play freely, one upon the other, as represented in Fig. 2. In this case, I have shown this joint as composed of an eye or staple, $v$, fastened to one of the levers, and working freely on a rod, $e$, attached to the other; but it is obvious that any other form of joint which will admit of a free movement of the levers may be used instead. With this arrangement of levers the driver, by placing his foot on the rear end of lever $c$, can raise the runners to any desired extent, so as to prevent them from pressing too deeply into soft or mellow soil; or raise them entirely clear of the ground, when desired. By pressing with his foot on the front end of the lever $d$, in like manner, he can depress the runners, and press them into the ground to any desired extent; which is oftentimes necessary when the ground is dry or hard, and in planting on sod ground.

In order to limit the depth of the runners, and adjust them to plant at a regular and even depth, I pivot to the standard that supports the seat, a latch $n$, which has an elongated notch or recess, $l$, in its under side near its front end, this notch being arranged to lock on a projecting stop, $h$, which is secured to the lever $d$ near its front end, as shown in Fig. 2. This stop $h$ is slotted longitudinally, and secured by a set-screw, as shown in Fig. 3, by which it can be adjusted forward or back, and thus hold the runners higher or lower, as may be required. In addition to this, I secure a permanent stop, $i$, on the lever $d$ in front of the stop $h$, by which, when the latch $n$ is locked thereon, the runners will be held elevated clear from the ground, as is necessary in going to and from the field and in turning around at the end of the rows; though generally this latter will be effected by the pressure of the driver's foot without the use of the latch. It will be observed that the notch $l$ in the latch $n$ is elongated, to allow some play of the levers. This is to permit the runners to adapt themselves to the inequalities of the surface, which they could not do if locked at at all times in a fixed position. The seed-tubes $m$, which connect the hoppers with the runners, are inclined backward as they descend, and at their lower end there is secured a vertical plate, $t$, which has its lower portion curved or inclined to the rear, as shown in Fig. 2. As the corn or seed falls from the hopper through the tube $m$ it will strike upon this plate $t$ and be thrown backward in the furrow, thereby counteracting or compensating for the forward movement of the machine while the seed is thus falling from the hopper to the ground, and thus the seed will be dropped at the point over which the hopper was at the instant the valve was moved. By this means, the seed can be deposited with greater accuracy in cross-rows, and the rows thus made more perfect and straight, thus greatly facilitating its after culture. Instead of locating the dropper's seat T upon the front or hinged portion of the machine, as is usual in this class of machines, I secure it by an arm, F, upon the main frame, as shown in Fig. 2. As there represented, I so arrange the two seats, on opposite sides of the axle, that they balance each other, or nearly so; and thus the weight of both driver and dropper is thrown directly upon the axle and wheels, and they made to counterbalance each other. By this arrangement the machine is caused to run more steady and even; and the runners, with the hoppers and seeding mechanism, are entirely relieved from the weight of the dropper, whereby they are more easily controlled by the driver through the medium of the levers $c\ d$.

As these machines are sometimes used for planting the corn or other seed in drills or continuous rows instead of hills, in which case the dropper is not required, a drilling apparatus being attached, instead of the hand-slides used for planting in hills, but which need not be here described, I make the front seat detachable, so that it can be removed when desired. This is accomplished by constructing its supporting-arm F with a tenon on its rear end, to fit into a mortise in the standard of the rear seat, and supporting it on a bracket or support, $p$, as shown in Fig. 2, there being a bolt, $v$, or similar catch, on the under side of the arm F, to engage behind the bracket $p$, and prevent the seat T from becoming accidentally disengaged.

By these improvements I am enabled to produce a very superior planter.

Having thus described my invention, what I claim is—

1. In combination with the rigid main frame, having the runners hinged or pivoted thereto, I claim the levers $c$ and $d$, arranged to operate substantially as set forth.

2. In combination with the levers, arranged to operate the runners, as described, I claim the pivoted latch or arm $n$, arranged to lock the levers in position, as set forth.

3. The lever $d$, having the adjustable catch $h$ applied thereto, and arranged to operate in combination with the latch $n$, as set forth.

4. The arrangement of the seat S and the levers $c\ d$ with their foot-pieces, substantially as described, whereby the driver can operate the levers by his feet, both to lock and unlock the same, as set forth.

JAMES SELBY.

Witnesses:
  W. C. DODGE,
  EDWIN J. McLAIN.